(12) United States Patent
Kishima et al.

(10) Patent No.: US 10,802,257 B2
(45) Date of Patent: *Oct. 13, 2020

(54) MICROSCOPE SYSTEM AND IMAGE DATA TRANSFER METHOD THEREFOR

(71) Applicant: Sony Corporation, Tokyo (JP)

(72) Inventors: Koichiro Kishima, Kanagawa (JP); Masaaki Hara, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/399,774

(22) Filed: Apr. 30, 2019

(65) Prior Publication Data

US 2019/0258039 A1 Aug. 22, 2019

Related U.S. Application Data

(63) Continuation of application No. 14/574,840, filed on Dec. 18, 2014, now Pat. No. 10,310,244.

(30) Foreign Application Priority Data

Dec. 25, 2013 (JP) ................................. 2013-267534

(51) Int. Cl.
*G02B 21/00* (2006.01)
*H04N 5/232* (2006.01)
*G02B 21/16* (2006.01)

(52) U.S. Cl.
CPC ....... *G02B 21/008* (2013.01); *G02B 21/0024* (2013.01); *G02B 21/0076* (2013.01); *G02B 21/16* (2013.01); *H04N 5/23229* (2013.01)

(58) Field of Classification Search
CPC ............ G02B 21/0024; G02B 21/0076; G02B 21/008; G02B 21/16; H04N 5/23229
(Continued)

(56) References Cited

U.S. PATENT DOCUMENTS 5,981,956 A * 11/1999 Stern ................... G02B 21/0084
250/458.1
6,313,452 B1 * 11/2001 Paragano ............... G02B 21/24
250/201.3
(Continued)

FOREIGN PATENT DOCUMENTS

JP 05-134186 A 5/1993
JP 07-325262 A 12/1995
(Continued)

OTHER PUBLICATIONS

Japanese Office Action and English translation thereof dated Apr. 10, 2018 in connection with Application No. 2017-131742.

*Primary Examiner* — Christopher S Kelley
*Assistant Examiner* — Kathleen M Walsh
(74) *Attorney, Agent, or Firm* — Wolf, Greenfield & Sacks, P.C.

(57) ABSTRACT

A microscope system includes a microscope apparatus including a stage on which a sample is placed and an objective lens that collects laser light to the sample on the stage, a light source unit including a light source that emits the laser light, a scanning mechanism configured to guide the laser light from the light source unit and change a direction of the guided laser light to scan the sample on the stage, a photodetector configured to guide returned light from the objective lens of the microscope apparatus and convert the guided light into an electrical signal, a controller configured to control at least the scanning mechanism and generate image data from the electrical signal output from the photodetector, and a computer connected to the controller through a bus interface and configured to process the image data transferred from the controller through the bus interface.

9 Claims, 5 Drawing Sheets

(58) Field of Classification Search
USPC .......................................................... 348/79
See application file for complete search history.

(56) References Cited

U.S. PATENT DOCUMENTS

| | | | | |
|---|---|---|---|---|
| 8,081,208 B2* | 12/2011 | Inomata | ................... | G03B 7/00 |
| | | | | 348/80 |
| 9,012,872 B1* | 4/2015 | Fang | ................... | G01N 21/648 |
| | | | | 250/461.2 |
| 9,304,085 B2 | 4/2016 | Watanabe et al. | | |
| 9,338,408 B2 | 5/2016 | Kishima et al. | | |
| 9,496,685 B2 | 11/2016 | Fujita et al. | | |
| 9,739,715 B2 | 8/2017 | Watanabe et al. | | |
| 9,964,757 B2 | 5/2018 | Fukumoto et al. | | |
| 10,310,244 B2* | 6/2019 | Kishima | ............. | G02B 21/0076 |
| 2004/0089816 A1* | 5/2004 | Quake | ................... | G01Q 30/18 |
| | | | | 250/458.1 |
| 2004/0223053 A1* | 11/2004 | Gladnick | ........... | G01N 21/8806 |
| | | | | 348/79 |
| 2007/0253056 A1* | 11/2007 | Tanemura | ............ | G02B 21/365 |
| | | | | 359/363 |
| 2009/0168157 A1 | 7/2009 | Tsurumune | | |
| 2009/0284853 A1 | 11/2009 | Griffiths et al. | | |
| 2010/0265323 A1* | 10/2010 | Perz | ..................... | G02B 21/244 |
| | | | | 348/79 |
| 2010/0284024 A1 | 11/2010 | Vucinic et al. | | |
| 2012/0007977 A1* | 1/2012 | Yamamoto | ......... | G02B 27/0075 |
| | | | | 348/79 |
| 2012/0098950 A1 | 4/2012 | Zheng et al. | | |
| 2013/0063565 A1 | 3/2013 | Hara et al. | | |
| 2013/0070054 A1* | 3/2013 | Takaya | ............... | G02B 21/0076 |
| | | | | 348/46 |
| 2013/0128024 A1 | 5/2013 | Kishima | | |
| 2013/0135456 A1 | 5/2013 | Kishima et al. | | |
| 2013/0229493 A1 | 9/2013 | Ikuta et al. | | |
| 2014/0247379 A1 | 9/2014 | Najmabadi et al. | | |
| 2015/0115176 A1 | 4/2015 | Watanabe et al. | | |
| 2015/0143274 A1 | 5/2015 | Hecht et al. | | |
| 2015/0177501 A1 | 6/2015 | Kishima et al. | | |
| 2015/0185456 A1 | 7/2015 | Kishima | | |
| 2015/0226949 A1 | 8/2015 | Fukumoto et al. | | |
| 2015/0241681 A1 | 8/2015 | Hara et al. | | |
| 2015/0325980 A1 | 11/2015 | Fujita et al. | | |
| 2016/0178524 A1 | 6/2016 | Watanabe et al. | | |
| 2016/0299170 A1 | 10/2016 | Ito et al. | | |

FOREIGN PATENT DOCUMENTS

| | | |
|---|---|---|
| JP | 10-090606 A | 4/1998 |
| JP | 2004-286598 A | 10/2004 |
| JP | 2005-117340 A | 4/2005 |
| JP | 2012-127985 A | 7/2012 |
| JP | 2013-003338 A | 1/2013 |
| WO | WO 2013/172085 A1 | 11/2013 |

* cited by examiner

MICROSCOPE SYSTEM AND IMAGE DATA TRANSFER METHOD THEREFOR

CROSS REFERENCE TO RELATED APPLICATIONS

This application is a continuation of U.S. patent application Ser. No. 14/574,840, entitled "MICROSCOPE SYSTEM AND IMAGE DATA TRANSFER METHOD THEREFOR," filed on Dec. 18, 2014, now U.S. Pat. No. 10,310,244, which claims the benefit of Japanese Priority Patent Application JP 2013-267534 filed Dec. 25, 2013, the entire contents of which are incorporated herein by reference.

BACKGROUND

The present disclosure relates to a microscope system that uses a laser microscope or the like that obtains an image of a sample by scanning the sample with laser light and to an image data transfer method.

As a laser microscope, the following is known.

To a fluorescently labeled sample, laser light is collected from a light source through an objective lens as excitation light. At this time, by changing a direction of the excitation light emitted from the light source with a galvano mirror, an irradiated position with the excitation light is moved on a sample, and thus the sample is scanned.

With the excitation light, a phosphor of the sample emits fluorescence. The fluorescence passes through a pin hole, a barrier filter, and the like formed at a confocal diaphragm and is guided to a photodetector. The photodetector converts detected fluorescence into an electrical signal and transmits the electrical signal to a control apparatus.

The control apparatus generates an image of the sample from the electrical signal from the photodetector and displays the image on a display apparatus (see, Japanese Patent Application Laid-open No. 2013-003338).

SUMMARY

The structure of a system is being studied in which image data generated by a control apparatus is transferred to another processing apparatus and stored therein, and the stored image data can be subjected to various high-speed image processings such as a removal of a noise or a blur by the processing apparatus.

Further, only absorbing image data that is successively generated by the control apparatus in a cache in the control apparatus has a limitation to manage high-speed continuous image taking with a laser microscope. That is, a technology for transferring image data at high speed from a control apparatus to a processing apparatus is being demanded.

In the microscope system, as the size of image data to be obtained becomes larger, a high-speed operation is further demanded in terms of various aspects, but a sufficient achievement is not obtained.

In view of the circumstances as described above, it is desirable to provide a microscope system and an image data transfer method therefor that are capable of contributing to the increase in the speed.

According to an embodiment of the present technology, there is provided a microscope system including a microscope apparatus, a light source unit, a scanning mechanism, a photodetector, a controller, and a computer.

The microscope apparatus includes a stage on which a sample is placed and an objective lens that collects laser light to the sample on the stage.

The light source unit includes a light source that emits the laser light.

The scanning mechanism is configured to guide the laser light from the light source unit and change a direction of the guided laser light to scan the sample on the stage.

The photodetector is configured to guide returned light from the objective lens of the microscope apparatus and convert the guided light into an electrical signal.

The controller is configured to control at least the scanning mechanism and generate image data from the electrical signal output from the photodetector.

The computer is connected to the controller through a bus interface and is configured to process the image data transferred from the controller through the bus interface.

The controller may further control the light source unit.

The computer may include at least one of GPGPU (General-Purpose computing on Graphics Processing Units) and GPU (Graphics Processing Units) for processing of the image data.

The scanning mechanism, the photodetector, and the controller may be integrated as a scanner unit.

According to another embodiment of the present technology, there is provided an image data transfer method for a microscope system including a microscope apparatus, a scanning mechanism, a photodetector, a controller, and a computer.

The microscope apparatus includes an objective lens that collects laser light to a sample on a stage.

The scanning mechanism is configured to guide the laser light emitted from a light source unit and change a direction of the guided laser light to scan the sample on the stage.

The photodetector is configured to guide returned light from the objective lens of the microscope apparatus and convert the guided light into an electrical signal.

The controller is configured to control at least the scanning mechanism and generate image data from the electrical signal output from the photodetector.

The computer is configured to process the image data generated by the controller.

The image data transfer method includes transferring the image data from the controller to the computer through a bus interface.

As described above, according to the embodiments of the present technology, it is possible to provide the microscope system capable of contributing to the increase in the speed.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

<First Embodiment>

(Structure of Microscope System)

As described above, in this embodiment, a description will be given on the structure in which the present technology is used for a laser scanning type microscope system.

Figure 1:
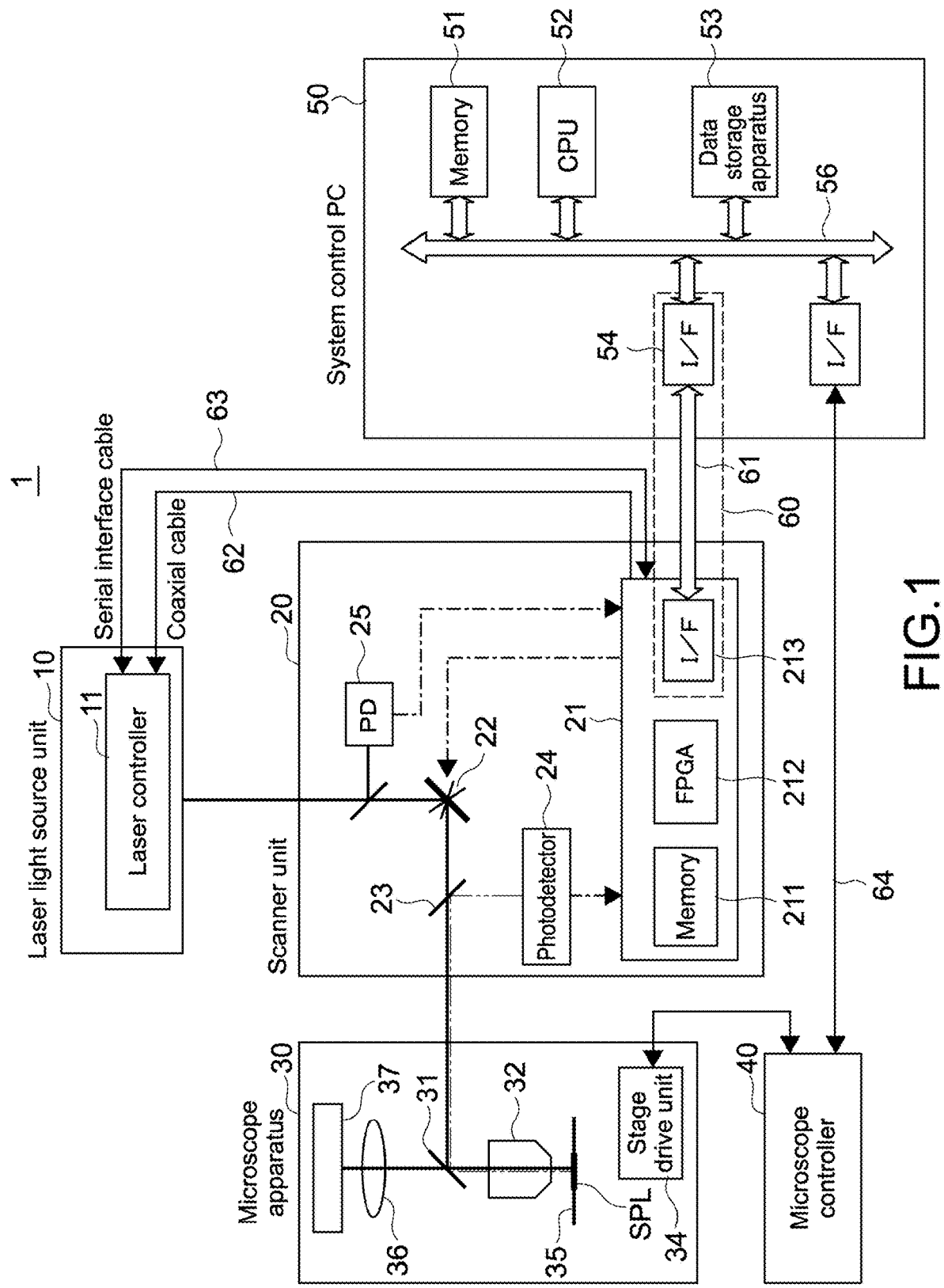
FIG. 1 is a diagram showing the structure of a microscope system according to a first embodiment of the present technology.

FIG. 1 is a diagram showing the structure of a microscope system according to a first embodiment of the present technology.

As shown in the figure, a microscope system 1 is provided with a laser light source unit 10, a scanner unit 20, a microscope apparatus 30, a microscope controller 40, and a system control PC (Personal Computer) 50.

(Laser Light Source Unit 10)

The laser light source unit 10 emits laser light (hereinafter, referred to as "excitation light") for exciting fluorochrome of a fluorescent sample SPL.

The laser light source unit 10 has a light source that uses a pulse laser. The light source that uses the pulse laser is, more specifically, an MOPA (Master Oscillator Power Amplifier) type light source formed by having a laser (Mode Locked Laser Diode) provided with an external resonator and a semiconductor optical amplifier (SOA). In recent years, with the MOPA type light source that uses a semiconductor laser, a light source that attains a high output of 100 W or more has been developed. The light source is low cost and compact. Therefore, if the light source can be mounted on a multiphoton microscope of a middle range, a possibility that the light source is used in widespread research institutions is increased, with the result that a great contribution to the medical and pharmaceutical field can be expected.

The laser light source unit 10 is provided with a laser controller 11. The laser controller 11 controls an intensity of laser light and timing of an emission interval or the like on the basis of a control signal from a scanner controller 21 of the scanner unit 20.

The excitation light emitted from the laser light source unit 10 is guided to the scanner unit 20.

(Scanner Unit 20)

The scanner unit 20 is provided with the scanner controller 21, a galvano mirror 22, a dichroic mirror 23, and a photodetector 24.

The galvano mirror 22 is constituted of one or more independently driven mirrors for changing the direction of the laser light so as to scan the fluorescent sample SPL placed on a stage 35 of the microscope apparatus 30 with the laser light guided from the laser light source unit 10.

The dichroic mirror 23 causes the laser light reflected on the galvano mirror 22 to pass therethrough, causes fluorescence returned from the microscope apparatus 30 to be reflected by 90 degrees, and guides the fluorescence to the photodetector 24.

The photodetector 24 converts light guided from the dichroic mirror 23 to an electrical signal corresponding to an intensity of light and guides the signal to the scanner controller 21.

The photodetector 24 is formed of, for example, a PMT (Photo Multiplier Tube) or the like. It should be noted that, in the case of a single photon confocal microscope, on an optical path, in front of the photodetector 24, a pin hole (not shown) is provided, although the pin hole is not provided in the case of a multiphoton confocal microscope. A position where the pin hole is provided is a conjugated position with a focal position of an objective lens 32.

Specifically, the scanner controller 21 is provided with a memory 211, an FPGA (Field Programmable Gate Array) 212, and a bypass interface circuit 213.

The scanner controller 21 performs control for the galvano mirror 22, control for the photodetector 24, and control for the laser light source unit 10.

The scanner controller 21 performs an A/D conversion for a signal output from the photodetector 24, a process of generating image data from the digital signal that has been subjected to the A/D conversion for each fluorescent sample SPL, and the like.

The scanner controller 21 is connected to a system bus 56 of the system control PC 50 through a bus interface cable 61 by the bypass interface circuit 213. Here, the bus interface cable 61 and the bypass interface circuit 213 of the scanner controller 21 and a bus interface circuit 54 (described later) of the system control PC 50 are collectively referred to as a "bus interface 60".

The image data generated by the scanner controller 21 is transferred to the system control PC 50 through the bus interface 60.

Here, the "bus interface" is an interface capable of transmitting and receiving a data signal, an address signal, a control signal, or the like to and from a CPU, a memory, or another hardware element such as a computation block. As a current typical bus interface, a PCI (Peripheral Components Interconnect) bus or the like is provided. In particular, these days, provided is a PCI Express, which is a PCI bus as a parallel bus serialized and connected by using a plurality of lanes, with the result that an increase in speed is achieved.

In addition, on the basis of the signal from the photodetector 24, the scanner controller 21 performs feedback control for the emission interval and the intensity of the excitation light from the light source of the laser light source unit 10.

For the connection of the scanner controller 21 and the laser light source unit 10, a coaxial cable 62, a serial interface cable 63 such as a USB (Universal Serial Bus), or the like is used.

The scanner controller 21 supplies a signal for the feedback control, such as an emission intensity and an emission timing of the light source of the laser light source unit 10 through the coaxial cable 62. Further, the scanner controller 21 supplies other control signals to the laser light source unit 10 through the serial interface cable 63.

(Microscope Apparatus 30)

The microscope apparatus 30 includes a filter 31, the objective lens 32, a stage 35, a stage drive unit 34, an imaging lens 36, and an image pickup unit 37.

On the stage 35, the fluorescent sample SPL as an observation target is placed.

The stage 35 can be moved in XY directions perpendicular to an optical axis of the objective lens 32 and in a Z direction along the optical axis by the microscope controller 40.

The filter 31 guides the excitation light guided from the scanner unit 20 to the objective lens 32 through a reflection by 90 degrees. Further, the filter 31 reflects fluorescence returned from the objective lens 32 by 90 degrees to guide the fluorescence to the scanner unit 20.

When not used as a laser microscope using the scanner unit 20, the microscope apparatus 30 includes the imaging lens 36 and the image pickup unit 37 in the case where a bright field observation or a fluorescence wide field-of-view (FOV) observation for the fluorescent sample SPL is performed by an illuminating apparatus (not shown).

The image pickup unit 37 takes a bright field image formed by the imaging lens 36 on an image pickup element. A image pickup signal is transmitted to the system control PC 50 through an interface cable (not shown).

(Microscope Controller 40)

The microscope controller 40 controls the stage drive unit 34 of the microscope apparatus 30.

The microscope controller 40 is connected with the system control PC 50 through an interface cable 64. On the basis of a control signal supplied from the system control PC 50 through the interface cable 64, the microscope controller 40 controls the stage drive unit 34 of the microscope apparatus 30.

For the connection of the microscope controller 40 and the system control PC 50, for example, a serial interface such as RS-232C and a USB.

(System Control PC 50)

The system control PC 50 includes a typical computer hardware structure. That is, the system control PC 50 includes a memory 51, a CPU (Central Processing Unit) 52, a data storage apparatus 53, a bus interface circuit 54, a serial interface circuit 55, a system bus 56, and the like.

In the data storage apparatus 53, an OS (Operating System), an application program for controlling the microscope system 1, an application program for performing an image processing, and the like are stored. Further, the data storage apparatus 53 stores image data transferred from the scanner controller 21 through the bus interface 60, a result of the image processing performed by the CPU 52 of the system control PC 50, and the like.

As the data storage apparatus 53, an HDD (Hard Disk Drive) is mainly used, but an optical disk drive, an SSD (Solid State Drive), or a storage of another kind may be used.

The CPU 52 controls the microscope system 1 in accordance with the OS and the application programs stored in the memory 51. For example, the CPU 52 supplies information relating to a movement of the stage 35 of the microscope apparatus 30 to the microscope controller 40 connected through the interface cable 64.

Further, the CPU 52 supplies various control signals to the scanner controller 21 through the bus interface 60.

In accordance with the OS and the application programs stored in the memory 51, the CPU 52 performs various processes with respect to the image data transferred from the scanner controller 21 through the bus interface 60.

More specifically, for example, the CPU 52 stores the image data transferred from the scanner controller 21 through the bus interface 60 in the data storage apparatus 53. Further, for example, the CPU 52 performs, with respect to the image data transferred from the scanner controller 21 through the bus interface 60 or the image data stored in the data storage apparatus 53, an image processing for removing a noise or a blur, a synthesis process for a plurality of images taken with laser light of a plurality of wavelengths with respect to the same sample, a process of extracting a feature area (ROI area) of an image, a computation of fluorescence brightness of the extracted ROI area, or another process.

Subsequently, a description will be given on an operation obtained by having the structure as described above by the microscope system 1 according to this embodiment.

(Control for Microscope System 1 and Increase in Speed of Image Data Transfer)

In the microscope system 1, the system control PC 50 transmits the control signal to the microscope controller 40 through the interface cable 64, with the result that the microscope controller 40 performs control or the like for the stage 35 in the microscope apparatus 30.

Further, the system control PC 50 transmits the control signal to the scanner controller 21 through the bus interface 60, with the result that various processes and control are performed in the scanner controller 21, and control for the laser light source unit 10 is performed.

That is, in the microscope system 1, the control system from the system control PC 50 is separated into the microscope controller 40 and the scanner controller 21. Thus, good responsiveness to a command of control from the system control PC 50 is obtained as a whole system.

Further, in the microscope system 1, used is such a form that the scanner controller 21 and the microscope controller 40 are individually connected to the system control PC 50 through a standard interface (PCI, serial interface, or the like). Therefore, it is easy to individually exchange the microscope controller 40 and the scanner unit 20.

In addition, the scanner controller 21 and the system control PC 50 are connected with each other via the bus interface 60. Thus, the following effect can be obtained.

The scanner controller 21 performs an A/D conversion for an electrical signal output from the photodetector 24 and creates image data from the signal that has been subjected to the A/D conversion on a sample basis. The scanner controller 21 transfers the created image data to the system control PC 50 through the bus interface 60. More specifically, the CPU 52 of the system control PC 50 reads, through the bus interface 60, the image data from the memory 211 in the scanner controller 21 and writes the data in the memory 51 in the system control PC 50.

As the bus interface 60, for example, if a high-speed interface such as PCI Express is used, it is possible to avoid the transfer speed of the image data from the scanner controller 21 to the system control PC 50 from being a bottleneck in the flow of obtaining the sample image in the microscope system 1 or the flow of obtaining a plurality of images successively. As a result, it is possible to achieve the high speed operation in the microscope system 1.

In the system control PC 50, with respect to the image data transferred from the scanner controller 21, an image processing is performed for the purpose of removal of a noise or a blur, synthesis, extraction of the feature area, analysis, or other various purposes.

Here, the image processing in the system control PC 50 may be performed asynchronously with the flow of obtaining a fluorescent image in the microscope system 1. However, depending on a request related to the speed from a user, only improving the spec of the basic hardware such as the CPU 52 and the memory 51 of the system control PC 50 may be insufficient.

In view of this, expansion of the hardware in the system control PC 50 is conceivable.

In a second embodiment to be described below, by expanding the hardware in the system control PC 50, the speed of the image processing is increased.

<Second Embodiment>

Figure 2:
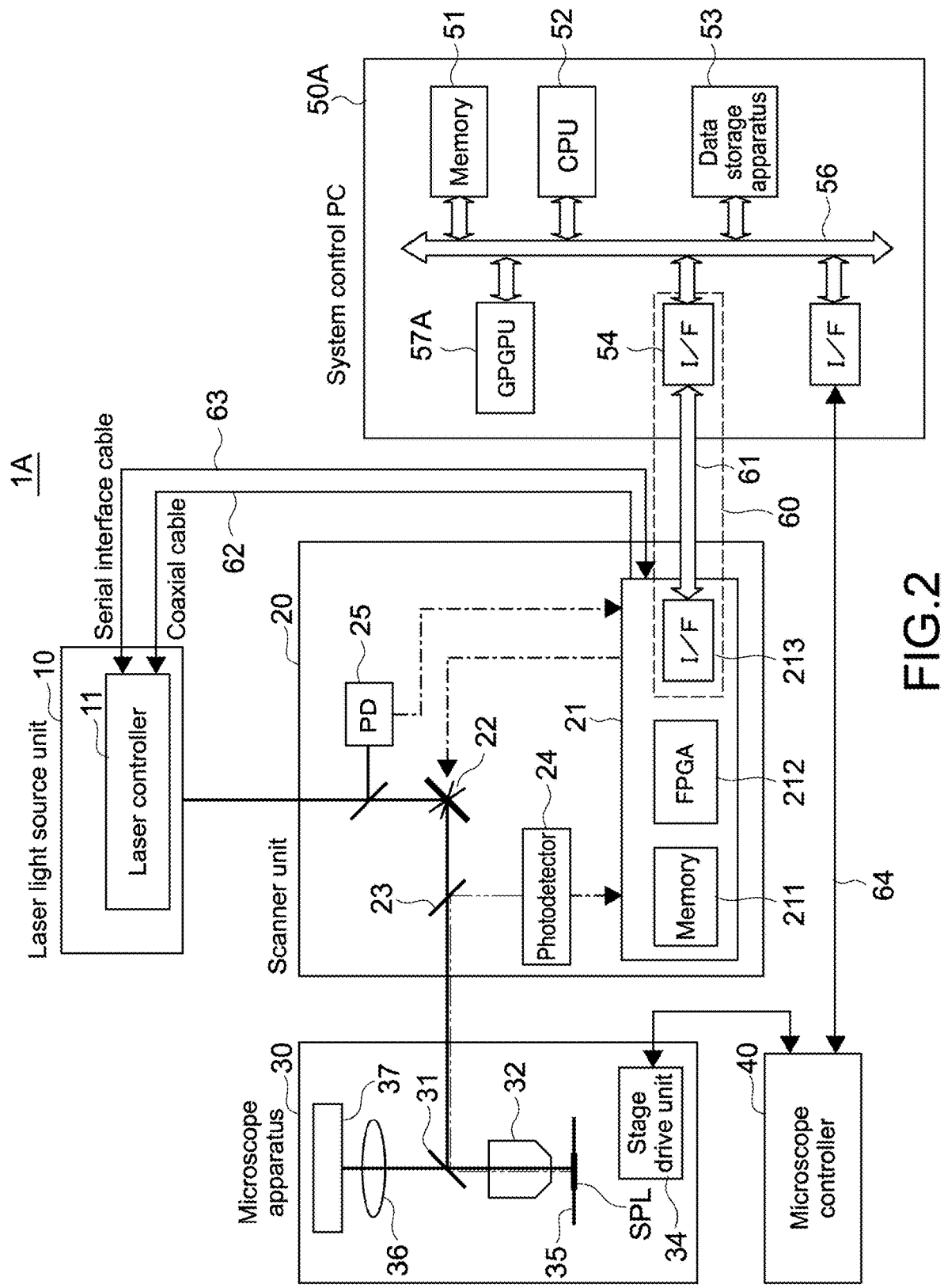
FIG. 2 is a diagram showing the structure of a microscope system according to a second embodiment of the present technology.

FIG. 2 is a diagram showing the structure of a microscope system according to a second embodiment of the present technology.

As shown in the figure, in this embodiment, a microscope system 1A is further provided with GPGPU (General-Purpose computing on Graphics Processing Units) 57A is added to a system control PC 50A.

The GPGPU 57A is connected to the system bus 56 of the system control PC 50A.

The GPGPU 57A is a computation processing apparatus designed in such a manner that GPU (Graphics Processing Units) for an image processing can also be used for other numerical computations in addition to the image processing.

It should be noted that, in the present technology, not only a GPGPU but also a GPU may be used.

In this embodiment, in the system control PC 50A, the image processing is performed by using the GPGPU 57A, or the image processing is performed by the GPGPU 57A and the CPU 52 in a dispersed manner or in a shared manner. As a result, it is possible to achieve the high speed image processing.

A parallel computation process by the GPGPU and the GPU is achieved by a mechanism in which the same command is issued to a plurality of computation units, and the computation units independently carry out the same command.

From this feature, as desirable kinds of the image processing performed by the GPGPU or the GPU, the following can be given.

1. 3D deconvolution
2. Trigger process by image recognition (3D deconvolution)

A 3D deconvolution refers to a technique for removing blur in a taken image.

Figure 3:
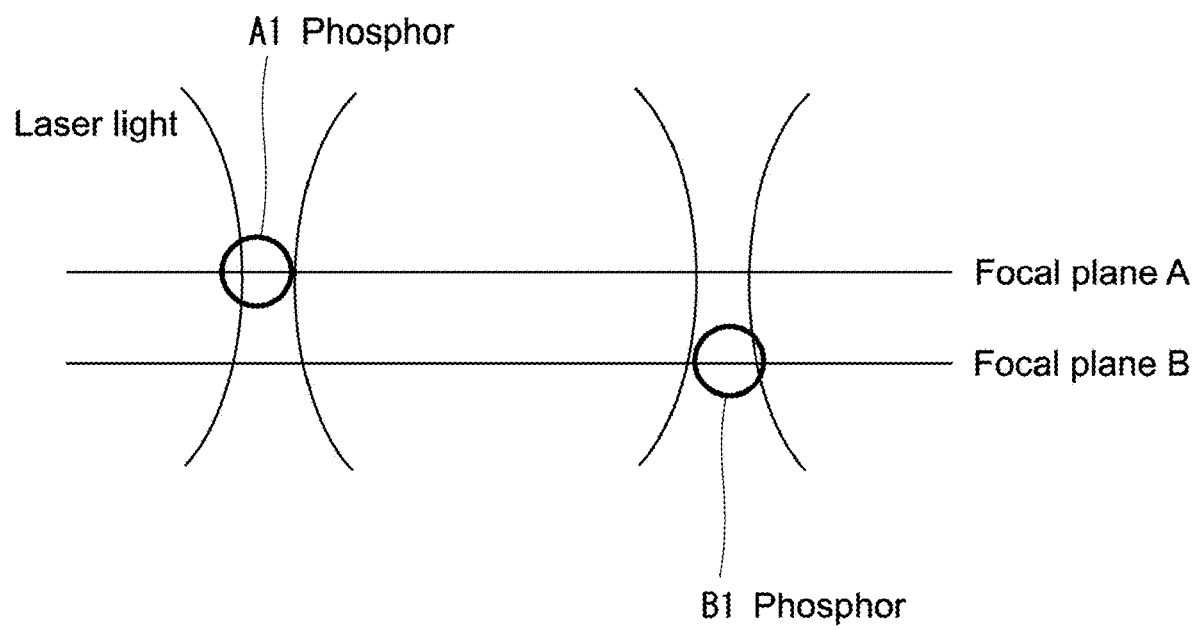
FIG. 3 is a diagram for explaining a principle of generation of a blur.
Figure 4:
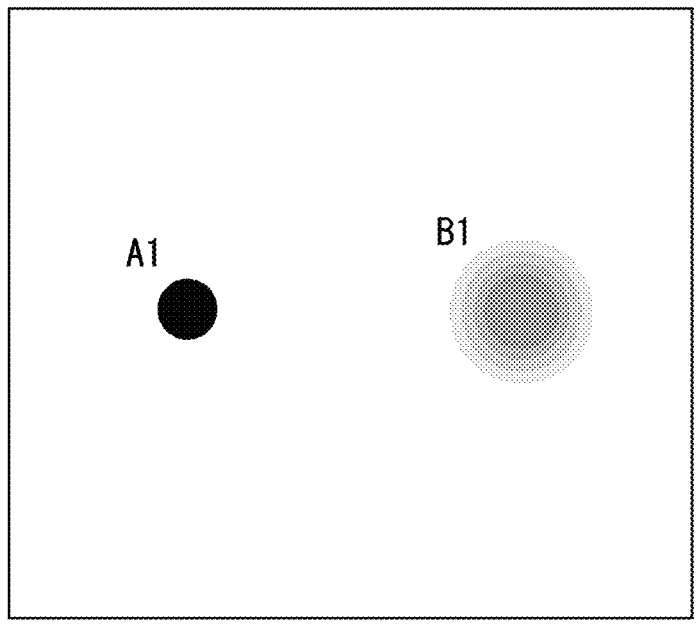
FIG. 4 is a diagram for explaining 3D deconvolution.
Figure 4:
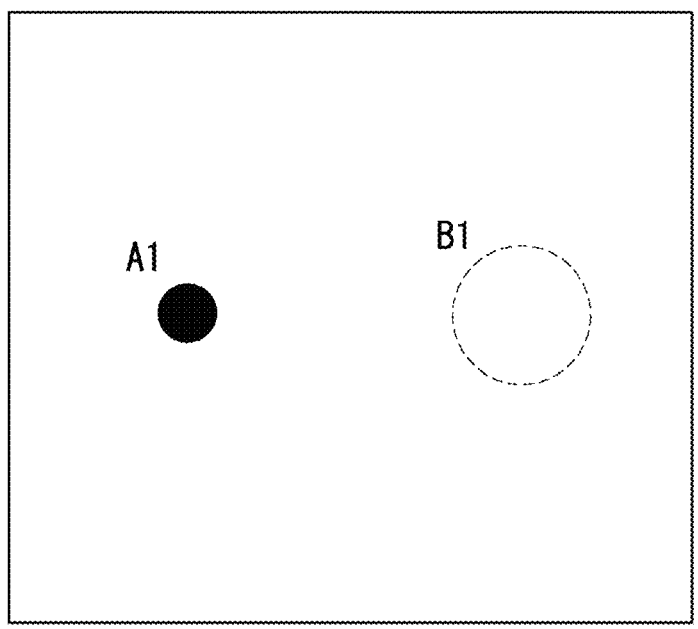

FIGS. 3 and 4 are diagrams for explaining 3D deconvolution.

As shown in the figure, the case where an image of a focal plane A is obtained by a two-photon excitation microscope system is assumed. the assumption is made that, on the focal plane A, a phosphor A1 exists, and on a focal plane B, a phosphor B1 different from the phosphor A1 exists. When an image of the focal plane A is obtained, the phosphor B1 does not exist on the focal plane A, but a part of the focal plane B is irradiated with laser light with energy to some extent. Therefore, fluorescence emitted from the phosphor B1 enters the image. This is a cause of a blur in the image (see, FIG. 4).

The blur generated in the image is derived from a point spread function (PSF) of an individual microscope system, which indicates a light intensity distribution on a focal point of the laser light. In view of this, the PSF is obtained by calculation from an optical constant or obtained experimentally, and the blur is removed from the image on the basis of this. This is the 3D deconvolution.

In a process of the 3D deconvolution, a position of bright spot is estimated with respect to an entire image, and the blur is removed on the basis of the PSF with the position of the bright spot as a reference. Therefore, in the case where a size of an image is large, it takes a long time to perform the process.

In the microscope system 1A according to the second embodiment, the 3D deconvolution process as described above is performed by the GPGPU 57A. The GPGPU 57A (or GPU) performs a parallel computation process, with the result that the high-speed process with respect to the entire image, such as the 3D deconvolution can be achieved.

(Trigger Process by Image Recognition)

At a timing of a cell division, control is performed to change an image obtaining rate or the like by the microscope system. For example, at the time of the cell division, the microscope system is controlled to obtain an image with a temporally high resolution (at a short time interval).

To detect the timing of the cell division, an image recognition process is necessary. The image processing is performed by a matching process for a plurality of images at different times. In the microscope system 1 according to the first embodiment, data of the plurality of images to be subjected to the matching is stored in the memory 51 of the system control PC 50, and the CPU 52 can perform the matching process for the data of the plurality of images. However, if a size of the image data is large, it takes a long time to perform the matching process.

In the microscope system 1A according to the second embodiment, the matching process for the image data as described above is performed by the GPGPU 57A. The GPGPU 57A (or the GPU) performs the matching process for the image data with respect to a plurality of areas in parallel by the parallel computation process. As a result, it is possible to achieve the high speed processing.

As described above, as the examples of kinds of the image processing that is desirably performed by the GPGPU 57A (or the GPU), the 3D deconvolution and the trigger process by the image recognition are given. When a process for an entire range of the image data is performed, it is possible to achieve the high speed processing by performing the process by the GPGPU 57A (or the GPU).

<Third Embodiment>

Figure 5:
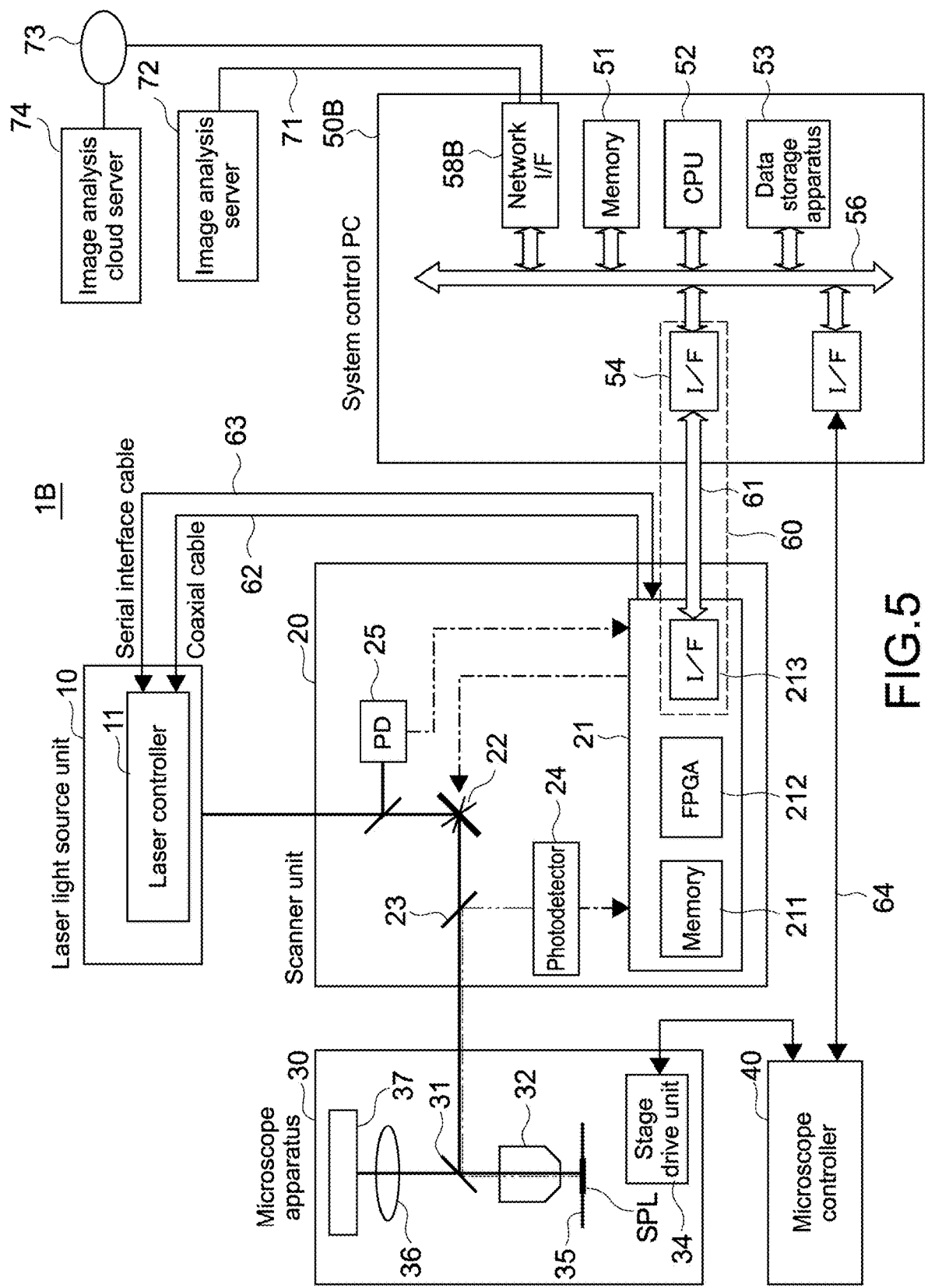
FIG. 5 is a diagram showing the structure of a microscope system according to a third embodiment of the present technology.

FIG. 5 is a diagram showing the structure of a microscope system according to a third embodiment of the present technology.

As shown in the figure, in a microscope system 1B according to this embodiment, a system control PC 50B can be connected to a local area network 71 and an Internet 73 via a network interface 58B.

The system control PC 50B can be connected to an image analysis server 72 that is provided in the local area network 71 and can be further connected to an image analysis cloud server 74 that is provided in the Internet 73.

In the microscope system 1B, the system control PC 50B causes all necessary image processings or a part thereof to be performed by at least one of the image analysis server 72 and the image analysis cloud server 74, and receives a result thereof.

By the microscope system 1B according to this embodiment, a load of the image processing by the system control PC 50B is reduced. As a result, it is possible to increase in speed of performing other processings and control in charge of the system control PC 50B.

It should be noted that, in the third embodiment, the system control PC 50B may be provided with GPGPU for the image processing.

Further, in the third embodiment, a server connected to the system control PC 50B may be either one of the image analysis server 72 and the image analysis cloud server 74. In the case where the image analysis server 72 and the image analysis cloud server 74 can be connected at the same time, different kinds of image processings can be shared and performed at the same time. Alternatively, a process with respect to one piece of image data may be performed by the image analysis server 72 and the image analysis cloud server 74 in a dispersed manner.

The number of image analysis server 72 and the number of image analysis cloud server 74 are not limited to one. To a plurality of image analysis servers 72, a request may be transmitted from the system control PC 50B at the same time, or to a plurality of image analysis cloud servers 74, a request may be transmitted from the system control PC 50B at the same time.

It should be noted that the present disclosure can take the following configurations.

(1) A microscope system, including:
a microscope apparatus including a stage on which a sample is placed and an objective lens that collects laser light to the sample on the stage;
a light source unit including a light source that emits the laser light;
a scanning mechanism configured to guide the laser light from the light source unit and change a direction of the guided laser light to scan the sample on the stage;
a photodetector configured to guide returned light from the objective lens of the microscope apparatus and convert the guided light into an electrical signal;
a controller configured to control at least the scanning mechanism and generate image data from the electrical signal output from the photodetector; and
a computer connected to the controller through a bus interface and configured to process the image data transferred from the controller through the bus interface.

(2) The microscope system according to Item (1), in which
the controller further controls the light source unit.

(3) The microscope system according to Item (1) or (2), in which
the computer includes at least one of GPGPU (General-Purpose computing on Graphics Processing Units) and GPU (Graphics Processing Units) for processing of the image data.

(4) The microscope system according to any one of Items (1) to (3), in which
the scanning mechanism, the photodetector, and the controller are integrated as a scanner unit.

It should be understood by those skilled in the art that various modifications, combinations, sub-combinations and alterations may occur depending on design requirements and other factors insofar as they are within the scope of the appended claims or the equivalents thereof.

What is claimed is:
1. A microscope system, comprising:
a microscope apparatus including a stage on which a sample is placed and an objective lens that collects laser light to the sample on the stage;
a microscope controller configured to control a stage drive unit of the microscope apparatus;
a light source unit including a light source that emits the laser light;
a scanning mechanism configured to guide the laser light from the light source unit and change a direction of the guided laser light to scan the sample on the stage;
a photodetector configured to:
detect light received from the microscope apparatus and convert the detected light into an electrical signal; and
provide the electrical signal to a scanning controller;
the scanning controller configured to:
control at least the scanning mechanism and generate image data from the electrical signal received from the photodetector; and
communicate a feedback control signal to the light source unit in response to the electrical signal received from the photodetector; and a computer connected to:
the microscope controller through a first interface, wherein the computer is configured to communicate a first control signal to the microscope controller via the first interface, and
the scanner controller though a second interface separate from the first interface,
wherein the second interface comprises a bidirectional bus interface and the computer is further configured to:
process the image data transferred from the scanner controller to the computer via the second interface; and
communicate a second control signal to the scanner controller via the second interface, wherein the second control signal is determined based on the processing of the image data by the computer, and wherein the second control signal is configured to control an image obtaining rate of the microscope system based on the processing of the image data by the computer.

2. The microscope system according to claim 1, wherein the scanner controller is further configured to control the light source unit.

3. The microscope system according to claim 2, wherein the computer includes at least one of GPGPU (General-Purpose computing on Graphics Processing Units) and GPU (Graphics Processing Units) for processing of the image data.

4. The microscope system according to claim 3, wherein the scanning mechanism, the photodetector, and the scanner controller are integrated as a scanner unit.

5. An image data transfer method for a microscope system including
a microscope apparatus including an objective lens that collects laser light to a sample on a stage,
a microscope controller configured to control a stage drive unit of the microscope apparatus,
a scanning mechanism configured to guide the laser light emitted from a light source unit and change a direction of the guided laser light to scan the sample on the stage,
a photodetector configured to:
detect light received from the microscope apparatus and convert the detected light into an electrical signal; and
provide the electrical signal to a scanning controller,
the scanning controller configured to:
control at least the scanning mechanism and generate image data from the electrical signal received from the photodetector, and
communicate a feedback control signal to the light source unit in response to the electrical signal received from the photodetector, and
a computer configured to:
communicate a first control signal to the microscope controller via a first interface, and
communicate a second control signal to the scanner controller via a second interface separate from the first interface, wherein the second interface comprises a bidirectional bus interface, wherein the second control signal is configured to control an image obtaining rate of the microscope system based on the processing of the image data by the computer,
the image data transfer method comprising:
transferring the image data from the scanner controller to the computer through the second interface.

6. The microscope system according to claim 1, wherein the feedback control signal is communicated to the light source unit to control an emission intensity or an emission timing of the light source of the light source unit.

7. The microscope system according to claim 1, wherein the light received from the microscope apparatus is light returned from the objective lens of the microscope apparatus.

8. The image data transfer method according to claim 5, wherein the feedback control signal is communicated to the light source unit to control an emission intensity or an emission timing of the light source of the light source unit.

9. The image data transfer method according to claim 5, wherein the light received from the microscope apparatus is light returned from the objective lens of the microscope apparatus.

* * * * *